United States Patent [19]

Stakhov

[11] 4,159,529
[45] Jun. 26, 1979

[54] FIBONACCI CODE ADDER

[75] Inventor: Alexei P. Stakhov, Vinnitsa, U.S.S.R.

[73] Assignees: Vinnitsky Politekhnichesky Institut, Vinnitsa; Taganrogsky Radiotekhnichesky Institut, Taganrog, both of U.S.S.R.

[21] Appl. No.: 861,412

[22] Filed: Dec. 16, 1977

[30] Foreign Application Priority Data

Dec. 22, 1976 [SU]  U.S.S.R. .............................. 2432391

[51] Int. Cl.$^2$ ............................ G06F 7/50; G06F 5/00
[52] U.S. Cl. .................................... 364/768; 235/310; 340/347 DD
[58] Field of Search ................ 364/768; 340/347 DD; 235/310

[56] References Cited

U.S. PATENT DOCUMENTS 3,575,591   4/1971   Chatelon et al. .................... 364/768

Primary Examiner—Jerry Smith
Attorney, Agent, or Firm—Fleit & Jacobson

[57] ABSTRACT

A Fibonacci code adder comprising an n-digit half-adder which includes at least two inputs through which addends of numbers represented in the Fibonacci code minimal form are introduced and also includes intermediate sum and carry outputs coupled to analogous inputs of a rewriting device having their intermediate sum and carry outputs coupled to analogous inputs of a Fibonacci code converter whose outputs produce the codeword of the final sum.

14 Claims, 4 Drawing Figures

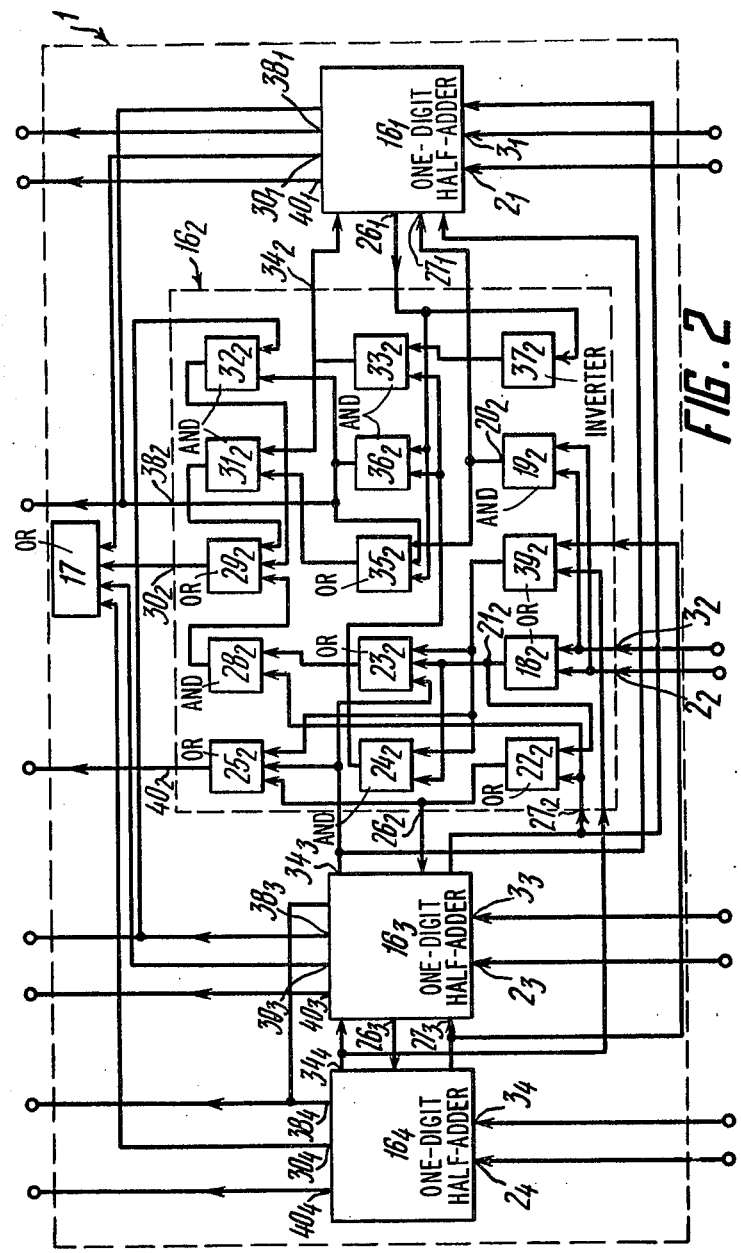

FIBONACCI CODE ADDER

FIELD OF THE INVENTION

This invention relates to digital data processing systems, and more particularly to adders which perform Fibonacci code add operations.

The invention is applicable to digital computers utilizing Fibonacci codes.

DESCRIPTION OF THE PRIOR ART

Known in the art is a Fibonacci code adder (cf. A. P. Stakhov, Introduction to Algorithmic Theory of Measurements, Moscow, 1977) comprising an n-digit half-adder whose multidigit intermediate sum and carry outputs are coupled to inputs of normalizers having their outputs coupled to augend and addend inputs of the n-digit half-adder, where n is the code length, and having their other inputs used as addend inputs of the Fibonacci code adder. The described adder operates to perform many times a series of add micro-cycles until the carry codeword contains zeros only ("zero carry"). Each micro-cycle involves the formation of intermediate sum and carry codewords in the n-digit half-adder and the reduction of these codewords to the Fibonacci code minimal form, the last-mentioned operation being performed in the normalizers.

The known Fibonacci code adder features a low speed of operation due to the fact that a large number of add micro-cycles is available. Moreover, it has a low controllability, since only one test relationship between Fibonacci code positions is checked as follows: the fault acknowledgement output of the adder produces an error signal, if an ith position of the n-digit half-adder contains concurrently two carry logic 1's from $(i+1)$th and $(i+2)$th positions.

DESCRIPTION OF THE INVENTION

An object of the invention is to provide a Fibonacci code adder with an increased speed of operation due to the fact that multiple add micro-cycles are excluded and the add operation is reduced down to two operations as follows: obtaining codewords representing intermediate sum and carry magnitudes and converting these codewords to the Fibonacci code minimal form.

Another object of the invention is to provide a Fibonacci code adder having an increased controllability by using three test relationships between Fibonacci code positions, based on properties inherent in Fibonacci series.

Still another object of the invention is to provide for an n-digit half-adder which can produce intermediate sum and carry codewords.

Another object of the invention is to provide a Fibonacci code minimal form converter and a rewriting device which is able to rewrite data from each position of the n-digit half-adder to the converter as 1's and 0's are obtained in respective positions of the n-digit half-adder.

In accordance with the invention, there is proposed a Fibonacci code adder comprising an n-digit half-adder provided with at least two multidigt inputs through which addends of numbers represented in the Fibonacci code minimal form are input, a multidigit intermediate sum output and a multidigit carry output of the n-digit half-adder being coupled, respectively, to a multidigit intermediate sum input and a carry input of a rewriting device having its multidigit intermediate sum input, its multidigit carry input and its control input coupled, respectively, to a multidigit intermediate sum input, to a multidigit carry input and to a control input of a Fibonacci code converter, and a fault acknowledgement output of the n-digit half-adder being coupled to a fault acknowledgement input of the Fibonacci code converter, where n is the length of the Fibonacci code.

Advantageously, a Fibonacci code adder, according to the invention, comprises an n-digit half-adder incorporating n identical one-digit half-adders each having its fault acknowledgement output coupled to a respective input of an OR gate of the n-digit half-adder, a primary carry output of a ith one-digit half-adder being coupled to one primary carry input of an $(i-1)$th one-digit half-adder and to the other primary carry input of an $(i-2)$th one-digit half-adder, a secondary carry output of the ith one-digit half-adder being coupled to one secondary input of the $(i-1)$th one-digit half-adder and to the other secondary carry input of the $(i-2)$th one-digit half-adder, a carry output and an initial sum output of the ith one-digit half-adder being coupled, respectively, to a carry input of the $(i-1)$th one-digit half-adder and to an initial sum input of an $(i+1)$th one-digit half-adder, where $i = 1, 2 \ldots n$.

Preferably, an ith one-digit half-adder, according to the invention, comprises OR gates, AND gates and an inverter, first and second inputs of an addend analysis OR gate being coupled, respectively, to first and second inputs of an addend analysis AND gate, the output of the addend analysis OR gate being coupled to first inputs of an initial sum OR gate, a first test signal selection OR gate and a carry analysis AND gate, the output of the initial sum OR gate being coupled to a first input of an intermediate sum OR gate, a second input of the initial sum OR gate being coupled to a first input of a first test signal selection AND gate having its second input coupled to the output of the first test signal selection OR gate and having its output coupled to a first input of a test OR gate having two other inputs coupled, respectively, to the output of a second test signal selection AND gate and to the output of a third test signal selection AND gate, a first input of the second test signal selection AND gate being coupled to the output of a secondary carry AND gate, a second input of the second test signal selection AND gate being coupled to the output of a second test signal selection OR gate having its first input coupled to a first input of a carry AND gate and to the input of the inverter, having its second input coupled to a first input of the third test signal selection AND gate and to the output of the carry AND gate and having its third input coupled to the output of the addend analysis AND gate, one of two other inputs of the intermediate sum OR gate being coupled to one of two other inputs of the first test signal selection OR gate, the remaining input of the intermediate sum OR gate being coupled to a second input of the carry analysis AND gate, to the remaining input of the first test signal selection AND gate and to the output of a carry analysis OR gate, the output of the carry analysis AND gate being coupled to a second input of the carry AND gate and to a first input of the secondary carry AND gate whose second input is coupled to the output of the inverter.

It is preferable that a rewriting device with a control input, according to the invention, comprises k identical rewriting cells each being provided with a delay having its output coupled to a first input of a high-order intermediate sum AND gate, to a first input of a high-order carry AND gate, to a first input of a low-order intermediate sum AND gate and to a first input of a low-order carry AND gate, the input of a delay of an mth rewriting cell being coupled to the output of a delay of an (m+1)th rewriting cell of the rewriting device, the input of a delay of a kth rewriting cell being used as the control input of the rewriting device, and the output of a delay of a first rewriting cell being used as a control output of the rewriting device, where $$m \begin{cases} 1,2 \ldots \frac{n}{2} & \text{at an even } n \\ 1,2 \ldots \frac{n+1}{2} & \text{at an odd } n, \text{ and} \end{cases}$$
$$k = 1,2 \ldots n.$$

It is advantageous that a Fibonacci code converter, according to the invention, comprises a store flip-flop and at least n identical conversion cells provided with message inputs and message outputs and with check acknowledgement outputs coupled to respective inputs of a test OR gate of the Fibonacci code converter, the output of the test OR gate being coupled to an input of a test OR gate of the Fibonacci code adder, a first communication output of each conversion cell being coupled to a first input of a transient analysis OR gate whose output is coupled to the input of an inverter and to the input of an electrical filter having its output coupled to the remaining input of the test OR gate of the Fibonacci code converter, the output of the inverter being coupled to a first input of an end-of-addition AND gate having its second input coupled to the "1" output of an end-of-rewriting flip-flop, a first communication input of the ith conversion cell being coupled to a message output of an $(i-1)$th conversion cell, a second communication input of the ith conversion cell being coupled to a second communication output of an $(i+1)$th conversion cell, a first communication output of the ith conversion cell being coupled to a third communication input of the $(i+1)$th conversion cell and to a fourth communication input of the $(i-1)$th conversion cell, and a first communication output of a high-order conversion cell being coupled to the "1" set input of the store flip-flop.

Preferable, each conversion cell, according to the invention, comprises an intermediate sum flip-flop and a carry flip-flop whose "1" set inputs are used as message inputs of the conversion cell, the "0" set input of the intermediate sum flip-flop being coupled to the output of a flip-flop state analysis AND gate having its first input coupled to the "0" output of the carry flip-flop and having its second input coupled to the "0" set input of the carry flip-flop and to the output of an OR gate of the conversion cell, a first input of the OR gate being coupled to the output of a convolution AND gate having its input coupled to the "1" output of the intermediate sum flip-flop used as the intermediate sum output of the conversion cell, the "0" output of the intermediate sum flip-flop being coupled to a first input of the test AND gate of the conversion cell, whose output is used as a fault acknowledgement output of the conversion cell, the second input of the test AND gate of the conversion cell being coupled to the "1" output of the carry flip-flop.

DESCRIPTION OF THE DRAWINGS

Other features and advantages of the invention will appear from the following description of a preferred embodiment thereof in conjunction with the accompanying drawings in which:

FIG. 2 is a block diagram of an n-digit half-adder, according to the invention;

DESCRIPTION OF THE INVENTION

Figure 1:
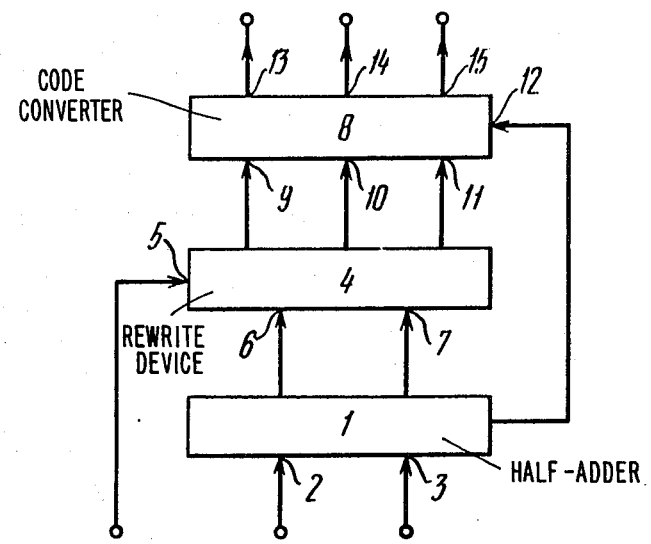
FIG. 1 is a block diagram of a Fibonacci code adder, according to the invention.

FIG. 1 illustrates a block diagram of a Fibonacci code adder comprising an n-digit half-adder 1 whose inputs are used, respectively, as a multidigit augend input 2 and a multidigit addend input 3 which accept numbers represented in Fibonacci codes. There is also provided a rewriting device having a control input 5 to deliver a rewrite data signal and a multidigit intermediate sum input 6 and a multidigit carry input 7 coupled, respectively, to an intermediate sum output and a carry output of the n-digit half-adder 1. The Fibonacci code adder also incorporates a Fibonacci code converter 8 having its multidigit intermediate sum input 9, its intermediate carry input 10, its control input 11 and its check acknowledgement input 12 coupled, respectively, to an intermediate sum output, a carry output, a control output of the rewriting device 4 and to a check acknowledgement output of the n-digit half-adder 1. One output of the Fibonacci code converter 8 is a multidigit one used as a message output 13 of the Fibonacci code adder, while the other output of the Fibonacci code converter 8 is used as an end-of-addition denote signal output 14 of the Fibonacci code adder. The remaining output of the Fibonacci code converter 8 is used as a fault acknowledgement output 15 of the Fibonacci code adder, which produces an error signal in the case of improper operation of the Fibonacci code adder.

FIG. 2 illustrates a block diagram of an n-digit half-adder 1 (with n=4). The n-digit half-adder 1 includes four one-digit half-adders $16_1$–$16_4$ and an OR gate 17 whose output is used as a fault acknowledgement output of the n-digit half-adder 1. An ith one-digit half-adder $16_i$ (in this case i=1,2,3,4) incorporates a series of AND and OR gates. All one-digit half-adders $16_1$–$16_4$ are identical.

Consider a block diagram of an ith one-digit half-adder $16_i$ in the case of i=2, namely, a second one-digit half-adder $16_2$. A first input of an addend analysis OR gate $18_2$ is a one-digit augend input $2_2$ of the Fibonacci code adder, while a second input of the addend analysis OR gate $18_2$ is a one-digit addend input $3_2$ of the Fibonacci code adder. When combined, the one-digit inputs $2_1$–$2_4$ and $3_1$–$3_4$ of the one digit half-adders 16—16 form, respectively, multidigit inputs 2 and 3 (FIG. 1). The inputs of the OR gate $18_2$ are coupled to first and second inputs of an addend analysis AND gate $19_2$ provided with an output $20_2$. An output $21_2$ of the addend analysis OR gate $18_2$ is coupled to one input of an initial sum OR gate $22_2$, to one input of a first test signal selection OR gate $23_2$ and to one input of a carry analysis AND gate $24_2$.

The output of an OR gate $22_2$ is coupled to a first input of an intermediate sum OR gate $25_2$ and is used as an initial sum output $26_2$ of the second one-digit half-adder $16_2$. A second input of the initial sum OR gate $22_2$ is used as a first primary carry input $27_2$ of the second one-digit half-adder $16_2$ and is coupled to a first input of a first test signal selection AND gate $28_2$ whose second input is coupled to the output of the first test signal selection OR gate $23_2$. The output of the first test signal selection AND gate $28_2$ is coupled to a first input of the test OR gate $29_2$ whose output is used as a fault acknowledgement output $30_2$ of the second one-digit half-adder $16_2$. Fault acknowledgement outputs $30_1$-$30_4$ of the one-digit half-adders $16_1$-$16_4$ are coupled to respective inputs of the OR gate 17. One of two other inputs of the test OR gate $29_2$ is coupled to the output of a second test signal selection AND gate $31_2$ and the remaining input of the test OR gate $29_2$ is coupled to the output of a third test signal selection AND gate $32_2$. A first input of the second test signal selection AND gate $31_2$ is coupled to the output of a secondary carry AND gate $33_2$ which is used as a secondary carry output $34_2$ of the second one-digit half-adder $16_2$. A second input of the second test signal selection AND gate $31_2$ is coupled to the output of a second test signal selection OR gate $35_2$. A first input of the second test signal selection OR gate $35_2$ is coupled to a first input of a carry AND gate $36_2$ and to the input of an inverter $37_2$ and is used as an initial sum input of the second one-digit half-adder $16_2$, coupled to the initial sum output $26_1$ of the first one-digit half-adder $16_1$. A second input of the second test signal selection OR gate $35_2$ is coupled to a first input of the third test signal selection AND gate $32_2$ and to the output of the carry AND gate $36_2$, used as a carry output $38_2$ of the second one-digit half-adder $16_2$. The remaining input of the second test signal selection OR gate $35_2$ is coupled to the output $20_2$ of the addend analysis AND gate $19_2$, used as a primary carry output of the second one-digit half-adder $16_2$. One of two other inputs of the intermediate sum OR gate $25_2$ is coupled to one of two other inputs of the first test signal selection OR gate $23_2$ and is used as a first secondary carry input of the second one-digit half-adder $16_2$, coupled to a secondary carry output $34_3$ of a third one-digit half-adder $16_3$. The remaining input of the intermediate sum OR gate $25_2$ is coupled to the remaining input of the carry analysis AND gate $24_2$, to the remaining input of the first test signal selection OR gate $23_2$ and to the output of a carry analysis OR gate $39_2$ whose first and second inputs are used, respectively, as a second primary carry input and a second secondary carry input of the second one-digit half-adder $16_2$. The output of the carry analysis AND gate $24_2$ is coupled to the remaining input of the carry AND gate $36_2$ and to a first input of the secondary carry AND gate $33_2$ having its second input coupled to the output of the inverter $37_2$. The output of the intermediate sum OR gate $25_2$ is used as an intermediate sum output $40_2$ of the second one-digit half-adder $16_2$ and the remaining input of the third test signal selection AND gate $32_2$ is used as a carry input of the second one-digit half-adder $16_2$, coupled to a carry output $38_3$ of the third, (i+1)th, one-digit half-adder $16_3$. The primary carry input $27_2$ of the second one-digit half-adder $16_2$ is coupled to a primary carry output of the third, (i+1)th, one-digit half-adder $16_3$ and to a second primary carry input of the first, (i−1)th, one-digit half-adder $16_1$. A secondary carry output $34_3$ of the third one-digit half-adder $16_3$ is coupled to a first secondary carry input of the second, ith, one-digit half-adder $16_2$ and to a second secondary carry input of the first one-digit half-adder $16_1$. The initial sum output $26_2$ of the second one-digit half-adder $16_2$ is coupled to an initial sum input of the third one-digit half-adder $16_3$. When combined, the carry outputs $38_1$-$38_4$ of the one-digit half-adders $16_1$-$16_4$ form a multidigit carry output of the n-digit half-adder 1 (FIG. 1) and the intermediate sum outputs $40_1$-$40_4$ (FIG. 2) of the one-digit half-adders $16_1$-$16_4$ form a multidigit intermediate output of the n-digit half-adder 1.

The addend analysis OR gate $18_2$, the initial sum OR gate $22_2$ and the intermediate sum OR gate $25_2$ are used to form intermediate and initial sum signals for the one-digit half-adder $16_2$. The carry analysis OR gate $39_2$ and the intermediate sum OR gate $25_2$ are used to form intermediate sum signals, while the addend analysis AND gate $19_2$ is used to form primary carry signals. The carry analysis AND gate $24_2$ and the carry AND gate $36_2$ are designed to form carry signals. The carry analysis AND gate $24_2$, the secondary carry AND gate $33_2$ and the inverter $37_2$ are used to form secondary carry signals. The first test signal selection OR gate $23_2$ and the first test signal selection AND gate $28_2$ are designed to form the first test signal. The second test signal selection OR gate $35_2$ and the second test signal selection AND gate $31_2$ are used to form the second test signal, while the third test signal selection AND gate $32_2$ is used to form the third test signal. The test OR gate $29_2$ is used to form an error signal at the fault acknowledgement output $30_2$ of the one-digit half-adder $16_2$. The one-digit half-adders $16_1$, $16_3$ and $16_4$ feature a design similar to that described for the second one-digit half-adder $16_2$.

Figure 3:
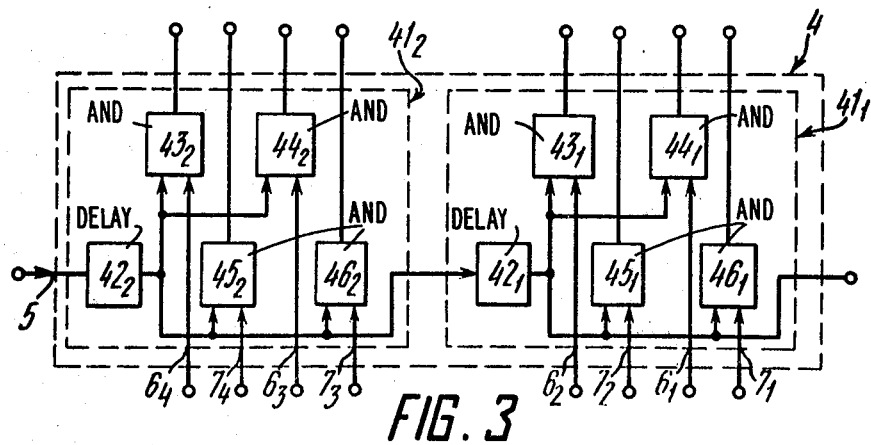
FIG. 3 is a block diagram of a rewriting device, according to the invention.

FIG. 3 illustrates a block diagram of the rewriting device 4 comprising two identical rewriting cells $41_1$ and $41_2$. The rewriting cell $41_2$ comprises, for example, a delay $42_2$ which provides for a pulse delay time $\tau$ which exceeds the time required for the formation of all output signals in two adjacent one-digit half-adders $16_3$ and $16_4$ (FIG. 2) having their intermediate sum and carry outputs coupled, respectively, to two one-digit inputs $6_3$ and $6_4$ and to one-digit inputs $7_3$ and $7_4$ of the rewriting cell $41_2$. When combined, one-digit inputs $6_4$, $6_3$, $6_2$, $6_1$ and one-digit inputs $7_4$, $7_3$, $7_2$, $7_1$ of the rewriting cells $41_2$ and $41_1$ form, respectively, the multidigit intermediate sum input 6 and the multidigit carry input 7 (FIG. 1) of the rewriting device 4.

The intermediate sum one-digit input $6_4$ (FIG. 3) is used as one input of a high-order intermediate sum AND gate $43_2$, while the intermediate sum one-digit input $6_2$ is used as one input of a low-order intermediate sum AND gate $44_2$. The outputs of the AND gates $43_2$ and $44_2$ form a two-digit intermediate sum output of the rewriting cell $41_2$. The one-digit carry inputs $7_4$ and $7_3$ are used, respectively, as inputs of a high-order carry AND gate $45_2$ and a low-order carry AND gate $46_2$ whose outputs are used to form a two-digit carry output of the rewriting cell $41_2$. Other inputs of the AND gates $43_2$, $44_2$, $45_2$, and $46_2$ are coupled to the output of the delay $42_2$, which is coupled, in turn, to the input of a delay $42_1$ of the rewriting cell $41_1$, and the output of the delay $42_1$ is used as a control output of the rewriting device 4. When combined, the two-digit intermediate sum outputs and the two-digit carry outputs of the rewriting cells $41_1$ and $41_2$ form, respectively, a multidigit intermediate output and a multidigit carry output of the rewriting device 4. The latter operates to rewrite in succession data from the n-digit half-adder 1 (FIG. 1) to the Fibonacci code converter 8, starting at high-order positions and in accordance with the production of intermediate sum and carry signals at the outputs $40_1$-$40_4$ and $38_1$-$38_4$ of the one-digit half-adders $16_1$-$16_4$.

Figure 4:
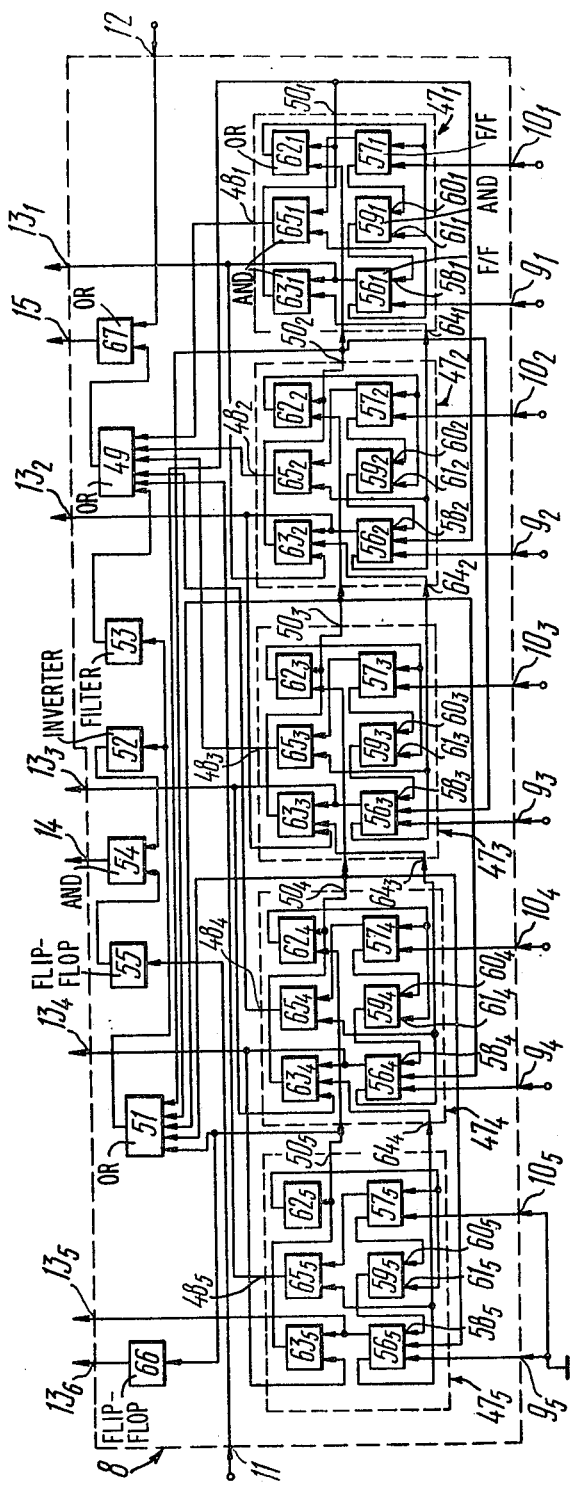
FIG. 4 is a block diagram of a Fibonacci code converter, according to the invention.

FIG. 4 illustrates a block diagram of the Fibonacci code converter 8 used to convert codewords representing intermediate sums and carries to the Fibonacci code minimal form representing the final sum. The Fibonacci code converter 8 includes (n+1) conversion cells, namely, five conversion cells $47_1$–$47_5$ which are identical devices designed to perform convolution operations relating to respective positions of a given codeword. Message inputs $9_1$–$9_4$ of the conversion cells $47_1$–$47_4$ are used to form the multidigit intermediate sum input 9 (FIG. 1) of the Fibonacci code converter 8, while message inputs $10_1$–$10_4$ (FIG. 4) of the conversion cells $47_1$–$47_4$ form the multidigit carry input 10 (FIG. 1) of the Fibonacci code converter 8. Message inputs $9_5$ and $10_5$ (FIG. 4) of the fifth conversion cell $47_5$ are coupled to a zero bus. The fifth conversion cell $47_5$ is designed to store and convert codeword positions in case the number of positions of the codeword of the final sum exceeds the number of positions contained in the codewords representing initial addends. Fault acknowledgement outputs $48_1$–$48_5$ of the conversion cells $47_1$–$47_5$ are coupled to respective inputs of the test OR gate 49 of the Fibonacci code converter 8. The output of the test OR gate 49 produces an error signal in the case of improper operation of the conversion cells $47_1$–$47_5$. First communication outputs $50_1$–$50_5$ of the conversion cells $47_1$–$47_5$ are coupled to respective intputs of a transient analysis OR gate 51 which produces transient denote signals relating to the Fibonacci code converter 8. The output of the transient analysis OR gate 51 is coupled to the input of an inverter 52 and to the input of an electrical filter 53 having its time constant exceeding the maximum time taken by a transient that takes place in the Fibonacci code converter 8 during code conversion. The output of the electrical filter 53 is coupled to the remaining input of the test OR gate 49. The output of the inverter 52 is coupled to a first input of an end-of-addition AND gate 54 whose output is the end-of-addition denote signal output 14 of the Fibonacci code adder 8. A second input of the end-of-addition AND gate 54 is coupled to the "1" output of an end-of-rewriting flip-flop 55 whose "1" set input is the control input 11 of the Fibonacci code converter 8. Each conversion cell, for example, the conversion cell $47_2$, comprises an intermediate sum flip-flop $56_2$ and a carry flip-flop $57_2$ having their "1" set inputs used, respectively, as the message inputs $9_2$, $10_2$ of the conversion cell $47_2$. The "0" set inputs $58_2$ of the intermediate sum flip-flop $56_2$ is coupled to the output of an analysis AND gate $59_2$ used to analyze the state of the carry flip-flop $57_2$. An input $60_2$ of the analysis AND gate $59_2$ is coupled to the "0" output of the carry flip-flop $57_2$, while an input $61_2$ is coupled to the "0" set input of the carry flip-flop $57_2$ and to the output of an OR gate $62_2$ which produces a reset signal for the carry flip-flop $57_2$. An input of the OR gate $62_2$ is coupled to the output of a convolution AND gate $63_2$ used to form convolution signals to handle positions of a given codeword. The output of the convolution AND gate $63_2$ is used as the first communication output $50_2$ of the conversion cell $47_2$. A first input of the convolution AND gate $63_2$ is a first communication input of the conversion cell $47_2$, coupled to a one-digit message output $13_1$ of the first conversion cell $47_1$. A second input of the convolution AND gate $63_2$ is a second communication input $64_2$ of the conversion cell $47_2$, coupled to a second communication output of the conversion cell $47_3$. The remaining input of the convolution AND gate $63_2$ is coupled to the "1" output of the intermediate sum flip-flop $56_2$, which is used as a one-digit message output $13_2$ of the second conversion cell $47_2$. The "0" output of the intermediate sum flip-flop $56_2$ is used as a second communication output of the conversion cell $47_2$ and is coupled to a first input of a test AND gate $65_2$ of the conversion cell $47_2$. The output of the test AND gate $65_2$ is used as a fault acknowledgement output $48_2$ of the conversion cell $47_2$, while a second input of the test AND gate $65_2$ is coupled to the "1" output of the carry flip-flop $57_2$. A first communication output 50 of the (i+1)th, (third) conversion cell $47_3$ is coupled to a third communication input of the (i+2)th (fourth) conversion cell $47_4$, which is a counting input of the intermediate sum flip-flop $56_2$, and to a fourth communication input of the ith (second) conversion cell $47_2$, which is the remaining input of the OR gate $62_2$. A first communication output $50_5$ of the fifth conversion cell $47_5$ is coupled to the "1" set input of a store flip-flop 66 which holds data when the number of positions of the final sum codeword exceeds the number of positions of codewords of the initial addends. One-digit outputs $13_1$–$13_5$ of the conversion cells $47_1$–$47_5$ and the "1" output $13_6$ of the store flip-flop 66 form the multidigit message output 13 (FIG. 1) of the Fibonacci code adder, which produces the final sum codeword.

The output of the test OR gate 49 (FIG. 4) is coupled to a first input of a test OR gate 67 of the Fibonacci code adder, while a second input of the test OR gate 67 is used as the fault acknowledgement input 12 of the Fibonacci code converter 8. The output of the test OR gate 67 is used as the fault acknowledgement output of the Fibonacci code adder.

The Fibonacci code adder operates as follows. Codewords representing numbers in the Fibonacci code minimal form are applied to the multidigit inputs 2 and 3 of the n-digit half-adder 1 which operates to form codewords representing intermediate sums and carrries, starting at high-order positions of the Fibonacci code and moving to low-order positions of the code. In this case, the codewords representing intermediate sums and carries take a form that differs from the minimal one. At the moment when the multidigit inputs 2 and 3 accept addend signals, the control input 5 accepts a rewrite signal which causes the rewriting device 4 to transfer data from the n-digit half-adder 1 to the Fibonacci code converter 8. The rewriting of data in the rewriting device 4 is a time-dependent process which starts at the one-digit half-adders $16_4$ and $16_3$ (FIG. 2) corresponding to high-order positions of the Fibonacci code. As the codewords representing intermediate sums and carries appear in the Fibonacci code converter 8, the latter converts them to the Fibonacci code minimal form which is the final sum. On completion of the rewriting process, the control output of the rewriting device 4 produces an end-of-rewriting denote signal which indicates that the rewriting is terminated, that signal being applied to the control input 11 of the Fibonacci code converter 8 and stored in the end-of-writing flip-flop 55 (FIG. 4) of the Fibonacci code converter 8. On the arrival of the end-of-writing denote signal and completion of conversion in the Fibonacci code converter 8, the end-of-addition denote signal output 14 of the latter produces a respective signal. In the case of improper operation of the n-digit half-adder 1 (FIG. 1) or the Fibonacci code converter 8, the fault acknowledgement output 15 of the Fibonacci code adder produces logic 1 to indicate that the Fibonacci code adder is at fault.

The codewords of intermediate sums and carries are formed in the n-digit half-adder 1 (for example, with n=4) as follows. With an augend (for example, 1010) and an addend (for example, 1010) applied, respectively, to the multidigit inputs 2,3, the production of the initial sum and the primary carry commences in the one-digit half-adders $16_1$–$16_4$ (FIG. 2) so that respective positions are arranged in a right-to-left succession. For example, in the case of the one-digit half-adder $16_2$, logic 1's applied to the one-digit inputs $2_2$ and $3_3$ result in the appearance of logic 1's at the output of the addend analysis OR gate $18_2$ and at the output of the addend analysis AND gate $19_2$. Logic 1 from the output of the addend analysis OR gate $18_2$ passes via the initial sum OR gate $22_2$ and the intermediate sum OR gate $25_2$ to the intermediate sum output $40_2$ and to the initial sum output $26_2$ of the one-digit half-adder $16_2$, that signal being passed from the initial sum output $26_2$ to the initial sum input of the third one-digit half-adder $16_3$. The signal present on the initial sum output $26_2$ is the initial sum signal for the second one-digit half-adder $16_2$. Logic 1 from the output of the addend analysis AND gate $19_2$, which is a carry signal, comes to the primary carry input $27_1$ of the first one-digit half-adder $16_1$ and passes through its own initial sum OR gate (not shown in FIG. 2) similar to the initial sum OR gate $22_2$ to the initial sum output $26_1$ and to the initial sum output of the second one-digit half-adder $16_2$. Also, that logic 1 passes through a first test signal selection OR gate (not shown in FIG. 2) similar to the intermediate sum OR gate $25_2$ to the intermediate sum output $40_1$. In the one-digit half-adders $16_1$, $16_3$ and $16_4$, intermediate sum signals are formed in a similar manner with the result that a codeword 1111 appears at the intermediate sum outputs $40_1$, $40_2$, $40_3$ and $40_4$.

Now consider how a carry codeword is produced (with the initial codeword equal to 1010). In the fourth one-digit half-adder $16_4$, the output of an addend analysis AND gate similar to the addend analysis AND gate 19, produces logic 1 which is a primary carry signal applied to the first primary carry input $27_3$ of the third one-digit half-adder $16_3$ and to the second primary carry input of the second one-digit half-adder $16_2$, namely, to an input of the carry analysis OR gate $39_2$. After passing through the carry analysis OR gate $39_2$, logic 1 appears at its output and at the output of the carry analysis AND gate $24_2$. This results in the appearance of logic 1 at the output of the carry AND gate $36_2$ and, therefore, at the carry output $38_2$ of the second one-digit half-adder $16_4$. No carry signals are produced in the fourth, third and first one-digit half-adders $16_4$, $16_3$, and $16_1$, since logic 0's are present on the second primary carry inputs of these one-digit half-adders. As a result, a carry codeword 0010 appears at the carry outputs $38_4$, $38_3$, $38_2$, and $38_1$.

Another example may be considered when Fibonacci codes of an augend 1010 and an addend 1000 are added. In this case, the above description applies to the production of intermediate sum and carry signals in the fourth, third and first one-digit half-adders $16_4$, $16_3$, and $16_1$.

In the second one-digit half-adder $16_2$, logic 1 appears at an input of the addend analysis OR gate $18_2$, thereby resulting in the appearance of logic 1 at the intermediate sum output $40_2$. Since one of the input signals is logic 0, there is logic 0 at the output of the addend analysis AND gate $19_2$, i.e., at the primary carry output of the second one-digit half-adder $16_2$ and at the primary carry input $27_1$ of the first one-digit half-adder $16_1$. Since logic 0's are present on the inputs $2_1$, $3_1$, then logic 0 appears at the initial sum output $26_1$ of the first one-digit half-adder $16_1$. That logic 0, after passing through the inverter $37_2$ of the second one-digit half-adder $18_2$, results in the appearance of logic 1 at an input of the secondary carry AND gate $33_2$. Applied to the primary carry input $27_3$ of the third one-digit half-adder $16_3$ and to the other primary carry input of the second one-digit half-adder $16_2$ is logic 1 produces in the fourth one-digit half-adder $16_4$ at the output of the addend analysis AND gate similar to the addend analysis AND gate $19_2$. As a result, the output of the carry analysis OR gate 39 produces logic 1 which causes the appearance of logic 1 at the output of the carry analysis AND gate $24_2$ and, therefore, at the output of the secondary carry AND gate $33_2$ which is the secondary carry output $34_2$ of the second one-digit half-adder $16_2$, coupled to an input of the intermediate sum OR gate similar to the intermediate sum OR gate $25_2$. Now, logic 1 from the secondary carry output $34_2$ passes to the intermediate sum output $40_1$ with the result that codewords 0000 and 1111 representing, respectively, the carry and the intermediate sum appear at the carry and intermediate sum outputs of the n-digit half-adder 1.

Consider a test procedure for the n-digit half-adder 1 when Fibonacci codes 0100 and 0100 are added. The actions performed in this case are similar to those described above. Therefore, logic 1 present on the primary carry input $27_2$ passes to an input of the first test signal selection AND gate $28_2$. If any one of the inputs $2_2$, $3_2$ accepts erroneously logic 1, then the latter also passes to an input of the first test signal selection AND gate $28_2$ with the result that its output produces logic 1 delivered to the output of the test OR gate 29, that logic 1 being handled as an error signal. If logic 1 appears erroneously at the secondary carry output $34_4$ of the fourth one-digit half-adder $16_4$, or at the primary carry output of the latter, coupled to the primary carry input $27_3$ and to the carry analysis OR gate $39_2$, then logic 1 appears at the output of the latter and passes via the first test signal selection OR gate $23_2$, the first test signal selection AND gate $28_2$ and the carry analysis OR gate $39_2$ to cause the appearance of logic 1, namely, an error signal, at the fault acknowledgement output $30_2$.

If logic 1 erroneously appears at the secondary carry outpt $34_3$ of the third one-digit half-adder $16_3$, that logic 1, after passing through the first test selection OR gate $23_2$, the first test signal selection AND gate $28_2$ and the carry analysis OR gate $29_2$, causes the appearance of logic 1, namely, an error signal, at the fault acknowledgement output $30_2$.

Note that due to the availability of the inverter 37 and a coupling established between the output of the addend analysis OR gate $19_2$ and the initial sum output $26_1$ through the initial sum OR gate of the first one-digit half-adde $16_1$ similar to the carry analysis AND gate $24_2$, logic 1's cannot appear concurrently at the secondary carry output $34_2$ and even at one of the inputs of the second test signal selection OR gate $35_2$. If logic 1's appear, however, due to a hardware check concurrently at the secondary carry output $34_2$ and even at one of the inputs of the second test signal selection OR gate $35_2$, then logic 1 passes through the second test signal selection AND gate $31_2$ and the test OR gate $29_2$ to the check acknowledgement output $30_2$.

In the case of proper operation of the n-digit half-adder 1 handling Fibonacci codes represented in the minimal form, logic 1's cannot appear concurrently, for example, at the carry outputs $38_2$, $38_3$ of the second and third one-digit half-adders $16_2$, $16_3$. If these logic 1's appear concurrently due to a hardware check, then the output of the third test signal selection AND gate $32_2$ produces logic 1 which, after passing through the test OR gate $29_2$, appears at the fault acknowledgement output $30_2$ as an error signal. With the latter present on even one of the fault acknowledgement outputs $30_1$–$30_4$, logic 1 appears at the output of the OR gate 17, which constitutes the fault acknowledgement output of the n-digit half-adder 1.

The rewriting device 4 operates as follows. The codewords representing intermediate sums and carries are delivered from the outputs of the n-digit half-adder 1 (FIG. 1) to the multidigit inputs 6, 7 of the rewriting device 4. Consider the case where a carry codeword 0010 and an intermediate sum codeword 1111 (relating to the first example described above) are rewritten. A rewrite signal is applied to the control input 5 whereas the codewords representing the augend and the addend are applied to the multidigit inputs 2, 3. After the delay time $\tau$, which considerably exceeds the time required for the production of the values of two high-order positions in the fourth and third one-digit half-adders $16_3$, $16_4$ (FIG. 2) has elapsed, the output of the delay 42 (FIG. 3) and, therefore, respective inputs of the AND gates $43_2$, $44_2$; $45_2$, $46_2$ accept a control signal. After signals 00 and 11 belonging to the high-order positions of the intermediate sum and the carry have been formed, they are passed to the one-digit inputs $6_4$, $6_3$ and $7_4$, $7_3$ of the rewriting cell $41_2$ and, therefore, to respective inputs of the AND gates $43_2$, $44_2$, $45_2$ and $46_2$. After the delay time $\tau$ has elapsed, other inputs of the AND gates $43_2$–$46_2$ accept logic 1 from the output of the delay $42_2$ with the result that input data is precisely reproduced at the outputs of the AND gates $43_2$–$46_2$. The same logic 1 from the output of the delay $42_2$ is used to activate the delay $42_1$ whose output produces logic 1, the delay time $\tau$ later, and carry signal 10 and intermediate sum signal 11 belonging to low-order positions are rewritten. Thus, the appearance of data at the outputs of the rewriting cells $41_2$ and $41_1$ is delayed by the delay time $\tau$. Logic 1 from the output of the delay $42_1$, after a 2 $\tau$ time interval has elapsed since a moment when a respective signal is applied to the control input 5, appears at the control input of the rewriting device 4 and, therefore, at the control input 11 (FIG. 1) of the Fibonacci code converter 8. With the intermediate sum signal 00 and the carry signal 11 applied, respectively, to the inputs $9_4$, $9_3$ and $10_4$, $10_3$ of the conversion cells $47_4$ and $47_3$ (FIG. 4) of the Fibonacci code converter 8, said cells begin to convert the codewords to the Fibonacci code minimal form. The conversion consists in performing the convolution operation which involves the high-order (third and fourth) positions of the intermediate sum codeword and the fifth position, corresponding to the fifth conversion cell $47_5$, as follows: $\underline{0\,1\,1}$. The sign $\underline{\quad}$ is used to designate the convolution operation. When the "1" set inputs of the flip-flops $56_4$ and $56_3$ accept logic 1's, the "1" outputs of these flip-flops produce logic 1's which pass through the convolution AND gate $63_4$ and the OR gate $62_4$ of the conversion cell $47_4$ and through the convolution AND cell $63_3$ and the OR gate $62_3$ of the conversion cell $47_3$ to the inputs $61_4$ and $61_3$ of the analysis AND gates $59_4$ and $59_3$. The inputs $60_4$, $60_3$ of the latter accept logic 1's from the "0" outputs of the flip-flops $57_4$, $57_3$ with the result that the outputs of the analysis AND gates $59_4$, $59_3$ produce logic 1's applied to the "0" inputs $58_4$, $58_3$ of the flip-flops $56_4$, $56_3$ so that the latter take up their "0" states. Logic 1 from the output of the convolution AND gate $63_4$ comes to the counting input of the flip-flop $56_5$ of the fifth conversion cell $47_5$, is stored in that flip-flop, then passes through the transient analysis OR gate 51 and is converted by the inverter 52 to logic 0 which inhibits the appearance of logic 1 at the output of the end-of-addition AND gate 54, i.e., at the end-of-addition denote signal output 14. After the convolution of two high-order positions 11 of the intermediate sum codeword has been completed, the values 0 1 0 0 are stored, respectively, in the flip-flops 66, $56_5$, $56_4$, $56_3$, these values being applied to the one-digit sum inputs $13_6$, $13_5$, $13_4$ and $13_3$. After the delay time $\tau$ has elapsed since a moment when the intermediate sum and carry signals are applied to the inputs $9_4$, $9_3$, $10_4$, $10_3$, the inputs $9_2$, $9_1$ accept signals corresponding to two remaining positions of the intermediate sum code, i.e. 11, while the inputs $10_2$, $10_1$ accept signals corresponding to two remaining positions of the carry code, i.e., 10. At the same time, the end-of-rewriting denote logic 1 is passed from the output of the rewriting device 4 (FIG. 1) to the control input 11 of the Fibonacci code converter 8. That logic 1 causes the end-of-rewriting flip-flop 55 (FIG. 4) to take up its "1" state, thereby resulting in the appearance of logic 1 at one of the inputs of the end-of-addition AND gate 54. On arrival of the intermediate sum and carry signals, the flip-flops $56_2$, $57_2$, $56_1$ assume their "1" states, while the flip-flop $57_1$ is held in its "0" state. The input $60_2$ of the analysis AND gate $59_2$ receives logic 0 from the "0" output of the flip-flop $57_2$ which inhibits the appearance of logic 1 at the output of the analysis AND gate 59. Since the flip-flop $56_3$ is held in its "0" state, its "0" output and, therefore, the output $64_2$ and a respective input of the convolution AND gate $63_2$ as well accept logic 1's. Since logic 1's from the "1" outputs of the flip-flops $56_2$, $56_1$ come to the remaining inputs of the convolution AND gate $63_2$, the output of the latter produces logic 1 which passes through the OR gate $62_2$ to the "0" set input of the flip-flop $57_2$ so as to send the latter into "0" state. Logic 1 from the output of the convolution AND gate $63_2$ also comes to the input of the OR gate $62_1$ of the conversion cell $47_1$ and, from the output of the OR gate $62_2$, to one input of the analysis AND gate $59_1$ whose another input accepts logic 1 from the "0" output of the flip-flop $57_1$. As a result, logic 1 appears at the output of the analysis gate $59_1$ and passes to the "0" set input of the flip-flop $56_1$ so as to place the latter in its "0" state. Logic 1 from the first communication output $50_2$ of the second conversion cell $47_2$ comes to the counting input of the flip-flop $56_3$ of the third conversion cell $47_3$ and causes the flip-flop $56_3$ to take up its "1" state. The same logic 1 also comes to a respective input of the transient analysis OR gate 51 and to the inverter 52 with the result that logic 0 appears at the output of the latter. That logic 0 comes to the end-of-addition AND gate 54 so that no signal is present at the end-of-addition denote signal output 14. During this processing step, the flip-flops 66 and $56_5$–$56_1$ receive the codeword 0 1 0 1 1 0 and the flip-flops $57_5$–$57_1$ receive the codeword 0 0 0 0 0, thereby resulting in the appearance of logic 1 at the inputs $60_1$–$60_5$ of the analysis AND gates $59_1$–$59_5$. The codeword written in the flip-flops $56_4$, $56_3$, $56_2$ of the conversion cells $47_4$, $47_3$, $47_2$ is represented as $\underline{0\,1\,1}$, a form which differs from the Fibonacci code minimal form. Therefore, the convolution condition for these positions is satisfied. The convolution operation similar to that described above is accomplished with the result that the codeword 0 1 1 0 0 0 is stored in the flip-flops 66 and $56_5$–$56_1$. Again, the convolution condition for the fifth, fourth and sixth positions is satisfied and the flip-flop 66 with its "1" set input coupled to the first communication output $50_5$ of the fifth conversion cell $47_5$ corresponds in this case to the sixth position. The convolution is performed same as described above and the codeword 1 0 0 0 0 0 appears which corresponds to the Fibonacci code minimal form of the final sum. As a rule, logic 1 is present on at least one of the first communication outputs $50_1$, $50_2$, $50_3$, $50_4$, and $50_5$, that logic 1 being applied to the input of the inverter 52 through the transient analysis OR gate 51. Therefore, logic 0 to inhibit the appearance of logic 1 at the end-of-addition denote signal output 14 is always present during convolution on the input of the end-of-addition AND gate 54. After the conversion is terminated, which means that all convolutions are performed, logic 0's appear at the first communication outputs $50_1$–$50_5$ with the result that the end-of-addition denote signal is produced at the end-of-addition denote signal output 14 to enable data to be read off the multidigit message output 13 (FIG. 1).

When the Fibonacci code adder is checked for serviceability one of its proper operation conditions requres that a carry logic 0 be always present in the presence of an intermediate sum logic 0 in one and the same position. If this condition is not satisfied, then logic 1's appear at the inputs of the test AND gates $65_1$–$65_5$ (FIG. 4), coupled to the "0" outputs of the flip-flops $57_1$–$57_5$. This results in the appearance of logic 1's at the fault acknowledgement outputs $48_1$–$48_5$ of the conversion cells $47_1$–$47_5$. These signals pass through the test OR gate 49 of the Fibonacci code converter 8 and through the test OR gate 67 of the Fibonacci code adder to the check acknowledgement output 15 of the Fibonacci code adder to indicate improper operation of the latter.

The Fibonacci code converter 8 can be checked for proper convolution operation as follows. If at least one of the first communication outputs $50_1$–$50_5$ generates a continuous signal whose length exceeds a maximum time required for the execution of all convolutions, then that signal passes through the transient analysis OR gate 51 to the input of the electrical filter 53 and appears at the output of the latter and, therefore, at the fault acknowledgement output 15 after a time interval determined by the time constant of the electrical filter 53 has elapsed.

The present invention provides for an increased speed of the Fibonacci code adder due to the fact that a large number of add micro-cycles are excluded and the entire addition process is reduced to two operations as follows: the production of the intermediate sum and carry and the conversion of all codewords representing them to the codeword of the final sum in the Fibonacci code minimal form. The speed of the Fibonacci code adder is also increased since the production of the intermediate sum and carry and the conversion of respective Fibonacci codes are performed in a parallel mode due to the availability of the rewriting device 4.

The Fibonacci code adder proposed features an increased hardware controllability provided by an increased number of test relationships available to each one-digit half-adder of the n-digit half-adder 1 and also resulted from the fact that one can check operations relating to the writing of data into the Fibonacci code converter and to the convolution of bits in the latter. An increase in the speed of the Fibonacci code adder is also attained as a result of the notifying of a moment when addition is terminated, thereby lessening the mean time required for the summation of a number of codewords.

What is claimed is:

1. A Fibonacci code adder comprising:
   an- n-digit half-adder provided with at least a multidigit augend input and a multidigit addend input used to accept numbers represented in the Fibonacci code minimal form, a fault acknowledgement output, a multidigit intermediate sum output, and a multidigit carry output,
   a rewriting device provided with a multidigit intermediate sum input, a multidigit carry input, a control output, a multidigit intermediate sum output, and a multidigit carry output,
   a Fibonacci code converter provided with a control input, a fault acknowledgement input, a check acknowledgement input, a multidigit intermediate sum input, a multidigit carry input, a fault acknowledgement output, a message output, and an end-of-addition denote signal output,
   said multidigit intermediate sum output and said multidigit carry output of said n-digit half-adder, coupled, respectively, to said multidigit intermediate sum input and said multidigit carry input of said rewriting device,
   said control output, said multidigit intermediate sum output and said multidigit carry output of said rewriting device, coupled, respectively, to said control input, said multidigit intermediate sum input and said multidigit carry input of said Fibonacci code converter,
   said fault acknowledgement output of said n-digit half-adder, coupled to said fault acknowledgement input of said Fibonacci code converter, where n is the length of the Fibonacci code.

2. A Fibonacci code adder as claimed in claim 1, wherein said n-digit half-adder comprises n identical one-digit half-adders termed,
   ith, (i−1)th, (i−2)th and (i+1)th one-digit half-adders,
   an OR gate provided with n inputs and an output,
   each of said one-digit half-adders, provided with a fault acknowledgement output, a one-digit carry output, a one-digit intermediate sum output, a primary carry output, a secondary carry output, an initial sum output, a one-digit augend input, a one-digit addend input, a first primary carry input, a second primary carry input, a first secondary carry input, a second secondary carry input, a carry input, and an initial sum input,
   said fault acknowledgement output of each of said one-digit half-adders, coupled to one of said inputs of said OR gate,
   said combined one-digit intermediate sum and carry outputs of all said one-digit half-adders, which are used, respectively, as said multidigit intermediate sum output and said multidigit carry output of said n-digit half-adder,
   said combined one-digit augend and addend inputs of all said one-digit half-adders, which are used, respectively, as said multidigit augend input and said multidigit addend input of said n-digit half-adder,
   said primary carry output of said ith one-digit half-adder, coupled to said first primary carry input and to said second primary carry input of said (i−1)th one-digit half-adder and said (i−2)th one-digit half-adder, respectively, said secondary carry output of said ith one-digit half-adder, coupled to said first secondary carry input and to said second secondary carry input of said (i−1)th one-digit half-adder and said (i−2)th one-digit half-adder, respectively, said one-digit carry output and said initial sum output of said ith one-digit half-adder, coupled, respectively, to said carry input of said (i−1)th one-digit half-adder and to said initial sum input of said (i+1)th one-digit half-adder, where i=1, 2 ... n.

3. A Fibonacci code adder as claimed in claim 2, wherein each of said one-digit half-adders comprises:
an addend analysis OR gate provided with two inputs,
an initial sum OR gate provided with two inputs,
a first test signal selection OR gate provided with three inputs,
an intermediate sum OR gate provided with three inputs,
a test OR gate of said one-digit half-adder provided with three inputs,
a second test signal selection OR gate provided with three inputs,
a carry analysis OR gate provided with two inputs,
an addend analysis AND gate,
a carry analysis AND gate,
a first test signal selection AND gate,
a second test signal selection AND gate,
a third test signal selection AND gate,
a secondary carry AND gate,
a carry AND gate,
an inverter,
said inputs of said addend analysis OR gate, used as said one-digit augend and addend inputs of said one-digit half-adder and coupled to inputs of said addend analysis AND gate,
the output of said addend analysis OR gate, coupled to one of said inputs of said initial sum OR gate, to one of said inputs of said first test signal selection OR gate and to one input of said carry analysis AND gate,
another one of said inputs of said initial sum OR gate, used as said initial sum input of said one-digit half-adder and coupled to one of inputs of said first test signal selection AND gate whose output is coupled to one of said inputs of said test OR gate,
the output of said initial sum OR gate, used as said initial sum output of said one-digit half-adder and coupled to one of said inputs of said intermediate sum OR gate whose output is used as said one-digit intermediate sum output of said one-digit half-adder,
another one of said inputs of said intermediate sum OR gate, used as one of said secondary carry inputs of said one-digit half-adder and coupled to one of said remaining inputs of said first test signal selection OR gate whose output is coupled to the remaining input of said first test signal selection AND gate,
the output of said carry analysis OR gate, coupled to a second input of said carry analysis AND gate, to a third input of said inputs of said intermediate sum OR gate and to a third input of said inputs of said first test signal selection OR gate, said first and second inputs of said carry analysis OR gate, used, respectively, as said second primary and secondary carry inputs of said one-digit half-adder, the output of said addend analysis AND gate, used as said primary carry output of said one-digit half-adder and coupled to one of said inputs of said second test signal selection OR gate, the output of said carry analysis AND gate, coupled to first inputs of said secondary carry AND gate and said carry AND gate, another one of said inputs of said second test signal selection OR gate, coupled to a second input of said carry AND gate and to the input of said inverter, used as said initial sum input of said one-digit half-adder, the output of said inverter, coupled to a second input of said secondary carry AND gate having its output used as said secondary carry output of said one-digit half-adder and coupled to one of inputs of second test signal selection AND gate, the output of said carry AND gate, used as said carry output of said one-digit half-adder and coupled to another one of said second test signal selection OR gate and to a first input of said third test signal selection AND gate, the output of said second test signal selection OR gate, coupled to a second input of said second test signal selection AND gate having its output coupled to one of said remaining inputs of said test OR gate;

a second input of said third test signal selection AND gate, used as said carry input of said one-digit half-adder, the output of said third test signal selection AND gate, coupled to a third input of said test OR gate whose output is used as said fault acknowledgement output of said one-digit half-adder.

4. A Fibonacci code adder as claimed in claim 3, wherein said rewriting device comprises k identical rewriting cells,
a first, mth and (m+1)th rewriting cell,
any one of said rewriting cells comprising:
a delay,
a high-order intermediate sum AND gate provided with two inputs,
a low-order intermediate sum AND gate provided with two inputs,
a high-order carry AND gate provided with two inputs,
a low-order carry AND gate provided with two inputs,
said first inputs of said high- and low-order intermediate sum AND gates of all rewriting cells, used to form said multidigit intermediate sum input of said rewriting device,
said inputs of said high- and low-order carry AND gates of all rewriting cells, used to form said multidigit carry input of said rewriting device,
the output of said delay of said mth rewriting device, coupled to second inputs of all said AND gates and to the input of the delay of said (m+1)th rewriting cell,
the input of said delay of said first rewriting cell and the output of said delay of said kth rewriting cell, used respectively, as said control input and said control output of said rewriting device,
combined outputs of said high- and low-order intermediate sum AND gates of all rewriting cells, used as said multidigit intermediate sum output of said rewriting device, combined outputs of said high- and low-order carry AND gates of all rewriting cells, used as said multidigit carry output of said rewriting device, where $$k = \begin{cases} n/2 & \text{with an even } n \\ (n+1)/2 & \text{with an odd } n, \text{ and} \end{cases}$$
$$m = 1, 2, 3 \ldots k.$$

5. A Fibonacci code adder as claimed in claim 4, wherein a Fibonacci code converter comprises:
   a test OR gate of said Fibonacci code converter, provided with at least (n+1) inputs,
   a test OR gate of the Fibonacci code adder, provided with two inputs,
   a store flip-flop,
   a transient analysis OR gate with at least n inputs,
   an end-of-rewriting flip-flop,
   an end-of-addition AND gate,
   an inverter,
   an electrical filter,
   at least n identical conversion cells,
   first, (i−1)th, ith, (i+1)th and nth conversion cells, each of said conversion cells being provided with:
   first and second message inputs,
   a message output and a fault acknowledgement output,
   first, second, third and fourth communication inputs,
   first and second communication outputs,
   said first and second message inputs of all said conversion cells, used, respectively, as said multidigit intermediate sum input and said multidigit carry input of said Fibonacci code converter,
   said message outputs of all said conversion cells and the "1" output of said store flip-flop, used as said multidigit message output of said Fibonacci code converter,
   said fault acknowledgement output of each said conversion cell, coupled to said first input of said test OR gate of the Fibonacci code converter, having its output coupled to a first input of said test OR gate of the Fibonacci code adder,
   said second input and said output of said test OR gate of the Fibonacci code adder, used, respectively, as said fault acknowledgement input and said fault acknowledgement output of said Fibonacci code converter,
   the "1" set input of said end-of-writing flip-flop, used as said control input of said Fibonacci code converter,
   the output of said end-of-rewriting flip-flop, coupled to one of inputs of said end-of-addition AND gate having its output used as said end-of-addition denote signal output of said Fibonacci code converter,
   said first communication output of each said conversion cell, coupled to one of said inputs of said transient analysis OR gate having its output coupled to the input of said inverter and to the input of said electrical filter,
   the outputs of said inverter and said electrical filter, coupled, respectively, to a second input of said end-of-addition AND gate and to the remaining input of said test OR gate of said Fibonacci code converter,
   said first communication input of said ith conversion cell, coupled to said message output of said (i−1)th conversion cell,
   said second communication input of said ith conversion cell, coupled to said second communication output of said (i+1)th conversion cell,
   said first communication output of said ith conversion cell, coupled to said third communication input of said (i+1)th conversion cell and to said fourth communication input of said (i−1)th conversion cell,
   said first communication output of said nth conversion cell, coupled to the "1" set input of said store flip-flop.

6. A Fibonacci code adder as claimed in claim 5, wherein each conversion cell comprises:
   an intermediate sum flip-flop with a "0" set input, a "1" set input, and a counting input,
   a "0" output, and a "1" output,
   a carry flip-flop provided with a "0" set input, a "1" set input, a "0" output, and a "1" output,
   a flip-flop state analysis AND gate,
   a convolution AND gate,
   an OR gate with at least two inputs,
   a test AND gate,
   said "1" set inputs of said intermediate sum flip-flop and said carry flip-flop, used, respectively, as said first message input and said second message input of said conversion cell,
   said "1" output of said intermediate sum flip-flop, coupled to one of inputs of said convolution AND gate, and the output of said test AND gate, used, respectively, as said message output and said fault acknowledgement outputs of said conversion cell,
   said "0" output of said intermediate sum flip-flop, coupled to one of inputs of said test AND gate, and the output of said convolution AND gate, coupled to one of inputs of the OR gate, used, respectively, as said second communication output and said first communication output of said conversion cell,
   said second and third inputs of said convolution AND gate, used as said first and second communication inputs,
   said counting input of said intermediate sum flip-flop and a second input of said OR gate, used, respectively, as third and fourth communication inputs of said conversion cell,
   said "1" output of said carry flip-flop, coupled to a second input of said test AND gate,
   said "0" output of said carry flip-flop, coupled to one of inputs of said flip-flop state analysis AND gate,
   the output of said OR gate, coupled to a second input of said flip-flop state analysis AND gate and to the "0" set input of said carry flip-flop.

7. A Fibonacci code adder as claimed in claim 3, wherein a Fibonacci code converter comprises:
   a test OR gate of said Fibonacci code converter, provided with at least (n+1) inputs,
   a test OR gate of the Fibonacci code adder, provided with two inputs,
   a store flip-flop,
   a transient analysis OR gate provided with at least n inputs,
   an end-of-rewriting flip-flop,
   an end-of-addition AND gate,
   an inverter,
   an electrical filter,
   at least n identical conversion cells, first, (i−1)th, ith, (i+1)th and nth conversion cells, each of said conversion cells being provided with:

first and second message inputs, a message output and a fault acknowledgement output, first, second, third and fourth communication inputs, first and second communication outputs, said first and second message inputs of all conversion cells, used, respectively, as said multidigit intermediate sum input and said multidigit carry input of said Fibonacci code converter, said message outputs of said conversion cells and the "1" output of said store flip-flop, used as said multidigit output of said Fibonacci code converter, said fault acknowledgement output of each said conversion cell, coupled to a first input of said test OR gate of the Fibonacci code converter having its output coupled to said first input of said test OR gate of the Fibonacci code adder, said second input and said second output of said test OR gate of the Fibonacci code adder, used, respectively, as said fault acknowledgement input and said fault acknowledgement output of the Fibonacci code converter, the "1" input of said end-of-rewriting flip-flop, used as said control input of said Fibonacci code converter, the output of said end-of-rewriting flip-flop, coupled to one of inputs of said end-of-addition AND gate having its output used as said end-of-addition denote signal output of said Fibonacci code converter, said first communication output of each said conversion cell, coupled to one of inputs of said transient analysis OR gate having its output coupled to the input of said inverter and to the input of said electrical filter, the outputs of said inverter and said electrical filter, coupled, respectively, to a second input of said end-of-addition AND gate and to the remaining input of said test OR gate of the Fibonacci code converter, said second communication input of said ith conversion cell, coupled to said message output of said (i−1)th conversion cell, said second communication input of said ith conversion cell, coupled to said second communication output of said (i+1)th conversion cell, said first communication output of said ith conversion cell, coupled to said third communication input of said (i+1)th conversion cell and to said fourth communication input of said (i−1)th conversion cell, said first communication output of said nth conversion cell, coupled to the "1" set output of said store flip-flop.

8. A Fibonacci code adder as claimed in claim 7, wherein each said conversion cell comprises:

an intermediate sum flip-flop provided with a "0" set input, a "1" set input, and a counting input, a "0" output, and a "1" output, a carry flip-flop provided with a "0" set input, a "1" set input, a "0" output, and a "1" output, a flip-flop state analysis AND gate, a convolution AND gate, an OR gate with at least two inputs, a test AND gate, said "1" set inputs of said intermediate sum flip-flop and said carry flip-flop, used, respectively, as said first message input and said second message input of said conversion cell, said "1" output of said intermediate sum flip-flop, coupled to one of inputs of said convolution AND gate, and the output of said test AND gate, used, respectively, as said message output and said fault acknowledgement output of said conversion cell, said "0" output of said intermediate sum flip-flop, coupled to one of inputs of said test AND gate, and the output of said convolution AND gate, coupled to one of inputs of the OR gate, used, respectively, as said second communication output and said first communication output of said conversion cell, said second and third inputs of said convolution AND gate, used as said first and second communication inputs, said counting input of said intermediate sum flip-flop and a second input of said OR gate, used, respectively, as said third and fourth communication inputs of said conversion cell, said "1" output of said carry flip-flop, coupled to a second input of said test AND gate, said "0" output of said carry flip-flop, coupled to one of inputs of said flip-flop state analysis AND gate, the output of said OR gate, coupled to a second input of said flip-flop state analysis AND gate and to the "0" input of said carry flip-flop.

9. A Fibonacci code adder as claimed in claim 2, wherein said rewriting device comprises k identical cells, a first, mth and (m+1)th rewriting cells, any one of said rewriting cells comprising:

a delay, a high-order intermediate sum AND gate provided with two inputs, a low-order intermediate sum AND gate provided with two inputs, a high-order carry AND gate provided with two inputs, a low-order carry AND gate provided with two inputs, said first inputs of said high- and low-order intermediate sum AND gates of all said rewriting cells, used to form said multidigit intermediate sum input of said rewriting device, said first inputs of said high- and low-order carry AND gates of all rewriting cells, used to form said multidigit carry input of said rewriting device, the output of said delay of said mth rewriting cell, coupled to second inputs of all said AND gates and to the input of said delay of said (m+1)th rewriting cell, the input of said delay of said first rewriting cell and the output of the delay of said kth rewriting cell, used, respectively, as said control input and said control output of said rewriting device, combined outputs of said high- and low-order intermediate sum AND gates of all said rewriting cells, used as said multidigit intermediate sum output of said rewriting device, combined outputs of said high- and low-order carry AND gates of all rewriting cells, used as said multidigit carry output of said rewriting device, where $n/2$ with an even $n$ $$k = \begin{cases} \text{-continued} \\ (n+1)/2 \quad \text{with an odd } n, \text{ and} \end{cases}$$
$$m = 1, 2, 3 \ldots k.$$

10. A Fibonacci code adder as claimed in claim 9, wherein said Fibonacci code converter comprises:
   a test OR gate of said Fibonacci code converter, provided with at least (n+1) inputs,
   a test OR gate of the Fibonacci code adder, provided with two inputs,
   a store flip-flop,
   a transient analysis OR gate with at least n inputs,
   an end-of-rewriting flip-flop,
   an end-of-addition AND gate,
   an inverter,
   an electrical filter,
   at least n identical conversion cells,
   first, (i−1)th, ith, (i+1)th and nth conversion cells,
   each of said conversion cells being provided with:
   first and second message inputs,
   a message output and a fault acknowledgement output,
   first, second, third and fourth communication inputs,
   first and second communication outputs,
   said first and second message inputs of all said conversion cells, used, respectively, as said multidigit intermediate sum input and said multidigit carry input of said Fibonacci code converter,
   said message outputs of all said conversion cells and the "1" output of said store flip-flop, used as said multidigit message output of said Fibonacci code converter,
   said fault acknowledgement output of each said conversion cell, coupled to a first input of said test OR gate of the Fibonacci code converter, having its output coupled to said first input of said test OR gate of the Fibonacci code adder,
   said second input and said output of said test OR gate of the Fibonacci code adder, used, respectively, as said fault acknowledgement input of and said fault acknowledgement output of said Fibonacci code converter,
   the "1" set input of said end-of-rewriting flip-flop, used as said control input of said Fibonacci code converter,
   the output of said end-of-rewriting flip-flop, coupled to one of inputs of said end-of-addition AND gate having its outputs used as said end-of-addition denote signal output of said Fibonacci code converter,
   said first communication output of each said conversion cell, coupled to one of said inputs of said transient analysis OR gate having its output coupled to the input of said inverter and to the input of said electrical filter,
   the outputs of said inverter and said electrical filter, coupled, respectively, to a second input of said end-of-addition AND gate and to the remaining input of said test OR gate of said Fibonacci code converter,
   said first communication input of said ith conversion cell, coupled to said message output of said (i−1)th conversion cell,
   said second communication input of said ith conversion cell, coupled to said second communication output of said (i+1)th conversion cell,
   said first communication output of said ith conversion cell, coupled to said third communication input of said (i+1)th conversion cell and to said fourth communication input of said (i+1)th conversion cell,
   said first communication output of said nth conversion cell, coupled to the "1" set input of said store flip-flop.

11. A Fibonacci code adder as claimed in claim 10, wherein each said conversion cell comprises:
   an intermediate sum flip-flop provided with a "0" set input, a "1" set input, and a counting input,
   a "0" output, and a "1" output,
   a carry flip-flop provided with a "0" set input, a "1" set input, a "0" output, and a "1" output,
   a flip-flop state analysis AND gate,
   a convolution AND gate,
   an OR gate with at least two inputs,
   a test AND gate,
   said "1" set inputs of said intermediate sum flip-flop and said carry flip-flop, used, respectively, as said first message input and said second message input of said conversion cell,
   said "1" output of said intermediate sum flip-flop, coupled to one of inputs of said convolution AND gate, and the output of said test AND gate, used, respectively, as said message output and said fault acknowledgement output of said conversion cell,
   said "0" output of said intermediate sum flip-flop, coupled to one of inputs of said convolution AND gate, and the output of said convolution AND gate, coupled to one of inputs of the OR gate, used, respectively, as said second communication output and said first communication output of said conversion cell,
   said second and third inputs of said convolution AND gate, used as said first and second communication inputs,
   said counting input of said intermediate sum flip-flop and a second input of said OR gate, used, respectively, as said third and fourth communication inputs of said conversion cell,
   said "1" output of said carry flip-flop, coupled to a second input of said test AND gate,
   said "0" output of said carry flip-flop, coupled to one of inputs of said flip-flop state analysis AND gate,
   the output of said OR gate, coupled to a second input of said flip-flop state analysis AND gate and to the "0" set input of said carry flip-flop.

12. A Fibonacci code adder as claimed in claim 1, wherein said rewriting device comprises k identical rewriting cells,
   first, mth and (m+1)th rewriting cells,
   any one of said rewriting cells comprising:
   a delay,
   a high-order intermediate sum AND gate provided with two inputs,
   a low-order intermediate sum AND gate provided with two inputs,
   a high-order carry AND gate provided with two inputs,
   a low-order carry AND gate provided with two inputs,
   said first inputs of said high- and low-order intermediate sum AND gates of all said rewriting cells, used to form said multidigit intermediate sum input of said rewriting device, said first inputs of said high- and low-order carry AND gates of all said rewriting cells, used to form said multidigit carry input of said rewriting device, the output of said delay of said mth rewriting cell, coupled to second inputs of all said AND gates and to the input of said delay of said (m+1)th rewriting cell, the input of said delay of said first rewriting cell and the output of said delay of said kth rewriting cell, used, respectively, as said control input and said control output of said rewriting device, combined outputs of said high- and low-order intermediate sum AND gates of all rewriting device, used as said multidigit intermediate sum output of said rewriting device, combined outputs of said high- and low-order carry AND gates of all rewriting cells, used as said multidigit carry output of said rewriting device, where $$k = \begin{cases} n/2 & \text{with an even } n \\ (n+1)/2 & \text{with an odd } n, \text{ and} \end{cases}$$

$$m = 1, 2, 3 \ldots k.$$

13. A Fibonacci code adder as claimed in claim 1, wherein a Fibonacci code converter comprises:
   a test OR gate of said Fibonacci code converter, provided with at least (n+1) inputs,
   a test OR gate of the Fibonacci code adder, provided with two inputs,
   a store flip-flop,
   a transient analysis OR gate with at least n inputs,
   an end-of-rewriting flip-flop,
   an end-of-addition AND gate,
   an inverter,
   an electrical filter,
   at least n identical conversion cells,
   first, (i−1)th, ith, (i+1)th and nth conversion cells, each of said conversion cells being provided with:
   first and second message inputs,
   a message output and a fault acknowledgement output,
   first, second, third and fourth communication inputs, first and second communication outputs,
   said first and second message inputs of all said conversion cells, used, respectively, as said multidigit intermediate sum input and said multidigit carry input of said Fibonacci code converter,
   said message outputs of all said conversion cells and the "1" output of said store flip-flop, used as said multidigit message output of said Fibonacci code converter,
   said fault acknowledgement output of each said conversion cell, coupled to a first input of said test OR gate of the Fibonacci code converter having its output coupled to said first input of said test OR gate of the Fibonacci code adder,
   said second input and said output of said test OR gate of the Fibonacci code adder, used, respectively, as said fault acknowledgement input and said fault acknowledgement output of said Fibonacci code converter,
   the "1" set input of said end-of-rewriting flip-flop, used as said control input of said Fibonacci code converter,
   the output of said end-of-rewriting flip-flop, coupled to one of inputs of said end-of-addition AND gate having its output used as said end-of-addition denote signal output of said Fibonacci code converter, said first communication output of each said conversion cell, coupled to one of said inputs of said transient analysis OR gate having its output coupled to the input of said inverter and to the input of said electrical filter, the outputs of said inverter and said electrical filter, coupled, respectively, to a second input of said end-of-addition AND gate and to the remaining input of said test OR gate of said Fibonacci code converter, said first communication input of said ith conversion cell, coupled to said message output of said (i−1)th conversion cell, said second communication input of said ith conversion cell, coupled to said second communication output of said (i+1)th conversion cell, said first communication output of said ith conversion cell, coupled to said third communication input of said (i+1)th conversion cell and to said fourth communication input of said (i−1)th conversion cell, said first communication output of said nth conversion cell, coupled to the "1" set input of said store flip-flop.

14. A Fibonacci code adder as claimed in claim 13, wherein each conversion cell comprises:
   an intermediate sum flip-flop provided with a "0" set input, a "1" set input, and a counting input,
   a "0" output, and a "1" output,
   a carry flip-flop provided with a "0" set input, a "1" set input, a "0" output, and a "1" output,
   a flip-flop state analysis AND gate,
   a convolution AND gate,
   an OR gate with at least two inputs,
   a test AND gate,
   said "1" set inputs of said intermediate sum flip-flop and said carry flip-flop, used, respectively, as said first essage input and said second message input of said conversion cell,
   said "1" output of said intermediate sum flip-flop, coupled to one of inputs of said convolution AND gate, and the output of said test AND gate, used, respectively, as said message output and said fault acknowledgement outputs of said conversion cell,
   said "0" output of said intermediate sum flip-flop, coupled to one of inputs of said test AND gate, and the output of said convolution AND gate, coupled to one of inputs of the OR gate, used, respectively, as said second communication output and said first communication output of said conversion cell,
   said second and third inputs of said convolution AND gate, used as said first and second communication inputs,
   said counting input of said intermediate sum flip-flop and a second input of said OR gate, used, respectively, as said third and fourth communication inputs of said conversion cell,
   said "1" output of said carry flip-flop, coupled to a second input of said test AND gate,
   said "0" output of said carry flip-flop, coupled to one of inputs of said flip-flop state analysis AND gate,
   the output of said OR gate, coupled to a second input of said flip-flop state analysis AND gate and to the "0" set input of said carry flip-flop.

* * * * *